United States Patent [19]

Ramsauer

[11] Patent Number: 4,873,745
[45] Date of Patent: Oct. 17, 1989

[54] UNHINGEABLE AND CONCEALED HINGE FOR SWITCHING BOXES

[76] Inventor: Dieter Ramsauer, Am Neuhauskothen 20, D-5620, Velbert 11, Fed. Rep. of Germany

[21] Appl. No.: 142,376

[22] Filed: Jan. 11, 1988

[30] Foreign Application Priority Data

Jan. 9, 1987 [DE] Fed. Rep. of Germany ....... 8700368

[51] Int. Cl.$^4$ ................................................ E05D 7/10
[52] U.S. Cl. ......................................... 16/258; 16/259; 16/264; 16/261; 16/379; 403/362; 403/378
[58] Field of Search .......................... 16/257, 258–261, 16/264, 379–381; 403/324, 362, 378, 379

[56] References Cited

U.S. PATENT DOCUMENTS

| 437,492 | 9/1890 | Herrick | 16/258 X |
| 2,131,802 | 10/1938 | Harmon | 16/258 |
| 2,778,053 | 1/1957 | Hess et al. | 16/258 |
| 2,913,200 | 11/1959 | Paine, Jr. et al. | 15/258 X |
| 3,021,555 | 2/1962 | Hogedal | 16/261 |
| 3,406,995 | 10/1968 | McCarthy et al. | |
| 4,372,703 | 2/1983 | Szostak | 403/324 |

FOREIGN PATENT DOCUMENTS

0157344 3/1985 European Pat. Off. .............. 16/261
473690 10/1937 United Kingdom .

OTHER PUBLICATIONS

EMKA Beschlagteile GmbH and Co. KG, Velbert, Mar. 1985.

Primary Examiner—Nicholas P. Godici
Assistant Examiner—William Scott Andes
Attorney, Agent, or Firm—Darby & Darby

[57] ABSTRACT

A concealed hinge for switching boxes which is unhingeable, the hinge having a first and second hinge part. The first hinge part having a bearing eye attached to an inside of a door leaf. The second hinge part surrounds the first hinge part in the shape of a U and is connectable to a vertical frame member of the box. The second hinge part has two bearing eyes on ends of a U-shaped member. The hinge parts are connected by a bearing bolt arrangement.

13 Claims, 5 Drawing Sheets

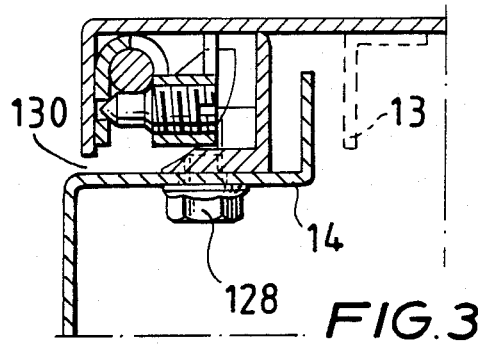
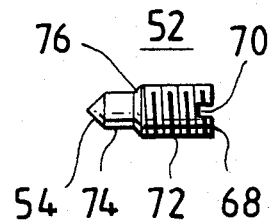
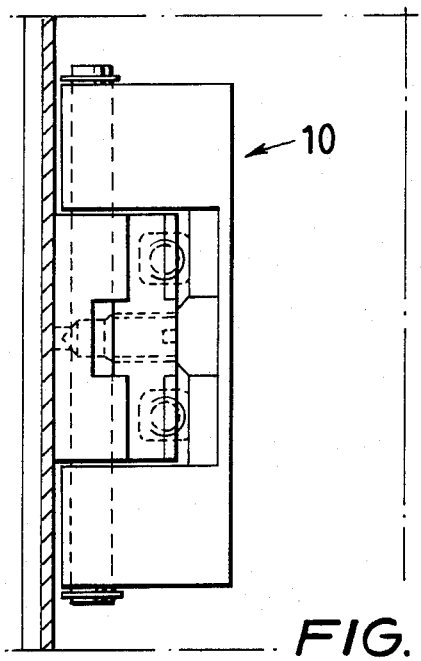
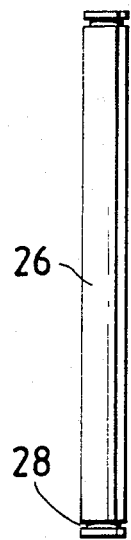
FIG.3
FIG.5
FIG.4
FIG.6
FIG.6A

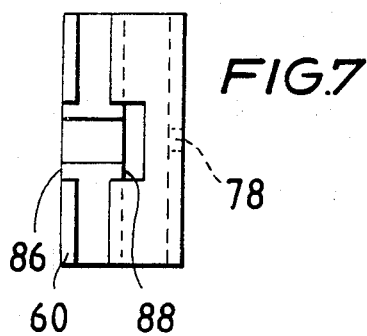
FIG.7
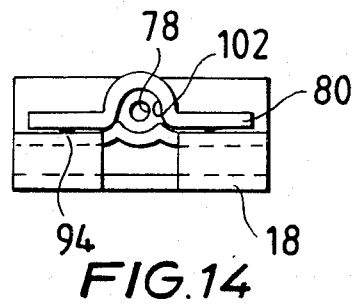
FIG.14
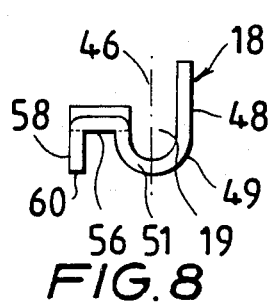
FIG.8
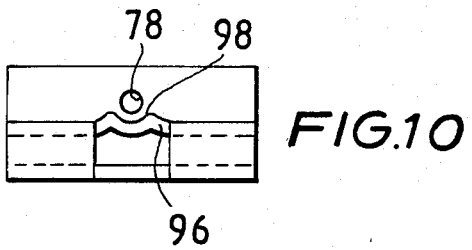
FIG.10
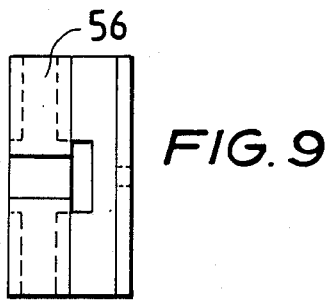
FIG.9
FIG.12
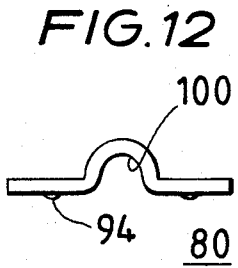
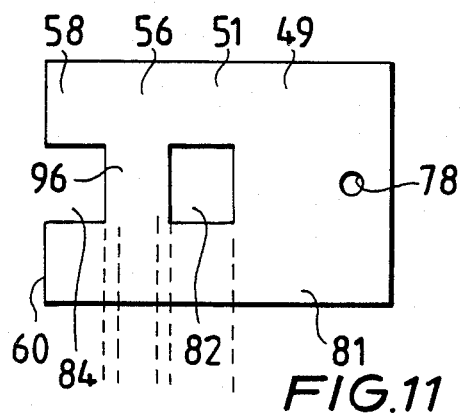
FIG.11
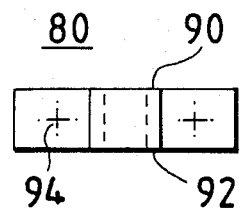
FIG.13

FIG.23A  FIG.23B  FIG.23C
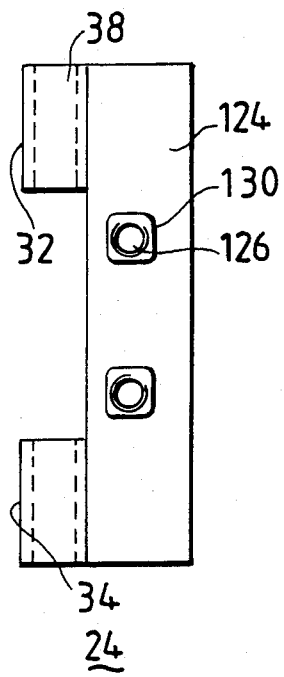
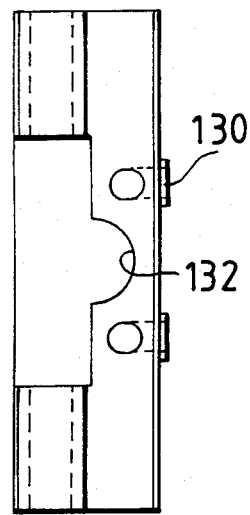
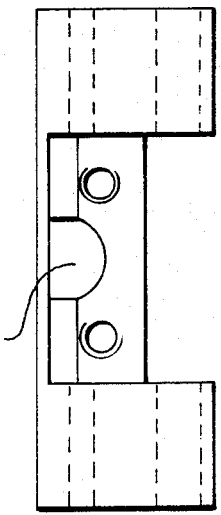
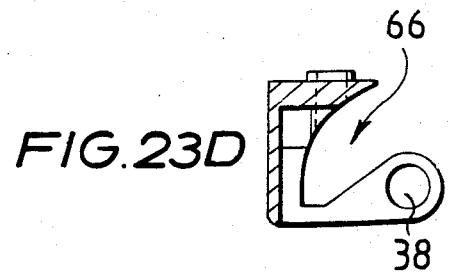
FIG.23D

UNHINGEABLE AND CONCEALED HINGE FOR SWITCHING BOXES

BACKGROUND OF THE INVENTION

1. Technical Field

The invention relates to an unhingeable and concealed hinge for switching boxes.

2. Discussion of Prior Art

A hinge is already disclosed in European patent application bearing publishing no. 0 157 344. Similar arrangements are also known from catalogue sheets C 090 and C 100 belonging to the company EMKA Beschlagteile GmbH & Co. KG, Velbert, from March 1985. The latter two designs have the disadvantage that to dismantle the door leaf from the box, the bearing bolt arrangements in the form of angled bolts have to be pulled upwards.

There must always be sufficient space to pull up these bolts and this cannot always be guaranteed. These designs are also disadvantageous in that subsequent assembly of the door leaf is made difficult as the bearing eye for the angled bolt is concealed, therefore hard to find and poorly accessible.

The hinge disclosed in the European patent specification is more advantageous because less space is required for pulling out the bearing bolt in order to dismantle the door—which has to be done occasionally in order to gain better access to the inside of the switching box during wiring. This advantage is due to the bearing bolt being split allowing the removal of each half of the bearing bolt to such an extent that they clear the bearing eye of the first hinge part lying between the U-limbs of the second hinge part. By means of special spring block arrangements the halves of the bearing bolt can also be held in the partially removed position so that subsequent reintroduction of these halves of the bearing bolt is unnecessary when the door leaf is reassembled on the door frame. This is because the ends of the bolt, which are still located in the second hinge part only have to be pressed into the first hinge part.

However, this design also has disadvantages. Two bolts have to be pulled, for which a special tool is required. Also, splitting the bearing bolt or hinge bolt reduces stability, because short bolts tend to tilt. Also, certain difficulties are involved in hanging as prior to inserting the two halves of the bearing bolt, the first and second hinge parts have to be brought into the correct position with regard to one another, in such a way that the bearing eyes of both hinge parts are flush. It has also been shown that as a result of accumulations of paint the bolt can be difficult to operate, so that manual force alone is not enough to push in the bolt, requiring a hammer to be used which can cause damage to the paintwork.

Furthermore, reference is made to catalogue sheets C 085.2 and C085.4, in which hinges are disclosed, on the one hand for individual box applications, and on the other for series box applications in which dismantling also occurs through pulling out an angled bolt, which in the first instance is also the bearing bolt. Both designs are very advantageous for particular applications, but have the disadvantages of requiring space for pulling out the bolt, difficult hanging, particularly when several hinges are attached to a door leaf and have to be simultaneously aligned. This can only succeed with difficulty because there are parts which pivot away which are difficult to manipulate simultaneously. A further disadvantage of the two latter hinges is also that they are visible.

SUMMARY OF THE INVENTION

The aim of the invention is to improve the state of the art of the unhingeable and concealed hinge, i.e. the hinge disclosed in European patent specification 0 157 344, so that the disadvantages described in connection with the state of the art can be avoided. It is an object to facilitate assembly and obtain better guidance through an undivided bolt being used without increased space being required between the upper end of the hinge and the upper end of the door leaf, as in other known hinges having only one bolt. Assembly and dismantling should also be possible without a special tool.

The problem is solved in that the bearing eye of the first hinge part is formed by a bearing block with a U-shaped cross section which takes up the bearing bolt of the second hinge, the bearing block being fixable in the corner area of the door and having over the open end of the U-section, movable clamping devices for clamping the bearing bolt of the second hinge in the U-section of the first hinge.

This measure facilitates pulling the first hinge part out of the second hinge part, without the bearing bolt of the first hinge part having to be displaced. With regard to the state of the art, it is also an advantage if only one part, instead of two parts has to be manipulated for example, a locking screw, which does not have to be fully removed from the hinge and therefore will not be misplaced. A further advantage is that alignment of the two hinge parts is facilitated as only rough preliminary fixing is required in order to be able to then tighten the clamping device. In the state of the art, however, precise preliminary fixing has to take place. In the present invention a simple tool such as a screwdriver, is sufficient, whereas in the state of the art, a special tool, and if necessary, a hammer, had to be used.

According to a further advantage of the present invention one of the limbs of the U-section of the bearing block of the first hinge is arranged parallel to the door leaf edge, whereas the other limb of the U-section is bent perpendicularly away from the first limb near the end of the receptacle for the bearing block and runs parallel and at a distance to the door leaf plane, and has at its end a further bend in the direction of the door leaf surface with which it rests on the door leaf surface, the clamping arrangement being formed by a screw with a conical front end which is taken up in a threaded boring in the bent limb.

The limb lying parallel to the door leaf edge can also have a boring for the tip of the screw, which is the clamping which substantially increases stability because the screw is then held at both of its ends.

The thread can be formed on a hoop that is screwed or welded onto the limb section lying parallel to the plane of the door leaf, which reduces manufacturing cost. One proven method of producing this U-section consists of the U-section being formed by two-stage stamping, with free stamping and then bending and shaping take place. This produces a stamping part which provides plenty of material for producing the thread.

The screw can include a threaded section with an end having an operating device such as a screwdriver slit, a connected cylindrical section of reduced diameter and a conical end, the diameter reduction preferably being formed by a conical surface.

The clamping device can be formed by an angled section which is fixed to the bent end of the U-section by means of a locking screw arrangement through a long hole in the angled section, one limb closing the U-profile, and, if necessary, supported on the U-limb parallel to the door leaf edge, and the other limb resting on the door leaf or on the section of the bent U-limb on the door leaf.

A further alternative embodiment is characterised in that the clamping arrangement is formed by a tension lock, a sprung bolt or a bolt which is operated by an eccentric screw.

BRIEF DESCRIPTION OF THE DRAWINGS

The invention will be described in more detail below with the aid of the embodiments shown in the diagram.

FIG. 3 is a partial cross sectional view taken from above, of the assembled two hinge parts each of which is shown FIGS. 1 and 2.

FIG. 4 is a side view of the assembled hinge with the door leaf removed.

FIG. 5 is the locking screw type of clamping device shown in the embodiment in FIGS. 3 and 4.

FIG. 6 is a side view of the bearing bolt shown in FIGS. 1, 3 and 4.

FIG. 6A is a bottom view of FIG. 6.

FIGS. 7, 8, 9, 10 are four different views of a stamped component for constructing the first hinge part according to the embodiment in FIGS. 3 and 4.

FIG. 11 is a preliminary component in the production of a stamped component according to FIGS. 7 to 10.

FIGS. 12 and 13 are two views of a further part, which in accordance with FIG. 14 can be assembled on the part according to FIGS. 7 to 10 thus forming the first hinge part as used in FIGS. 3 and 4.

FIGS. 23A, 23B, 23C and 23D respectively show left side, front, right side and partially sectioned bottom views of the second hinge part in an embodiment as used in FIGS. 3 and 4.

DETAILED DESCRIPTION OF THE PREFERRED EMBODIMENT

Figures 1, 2:
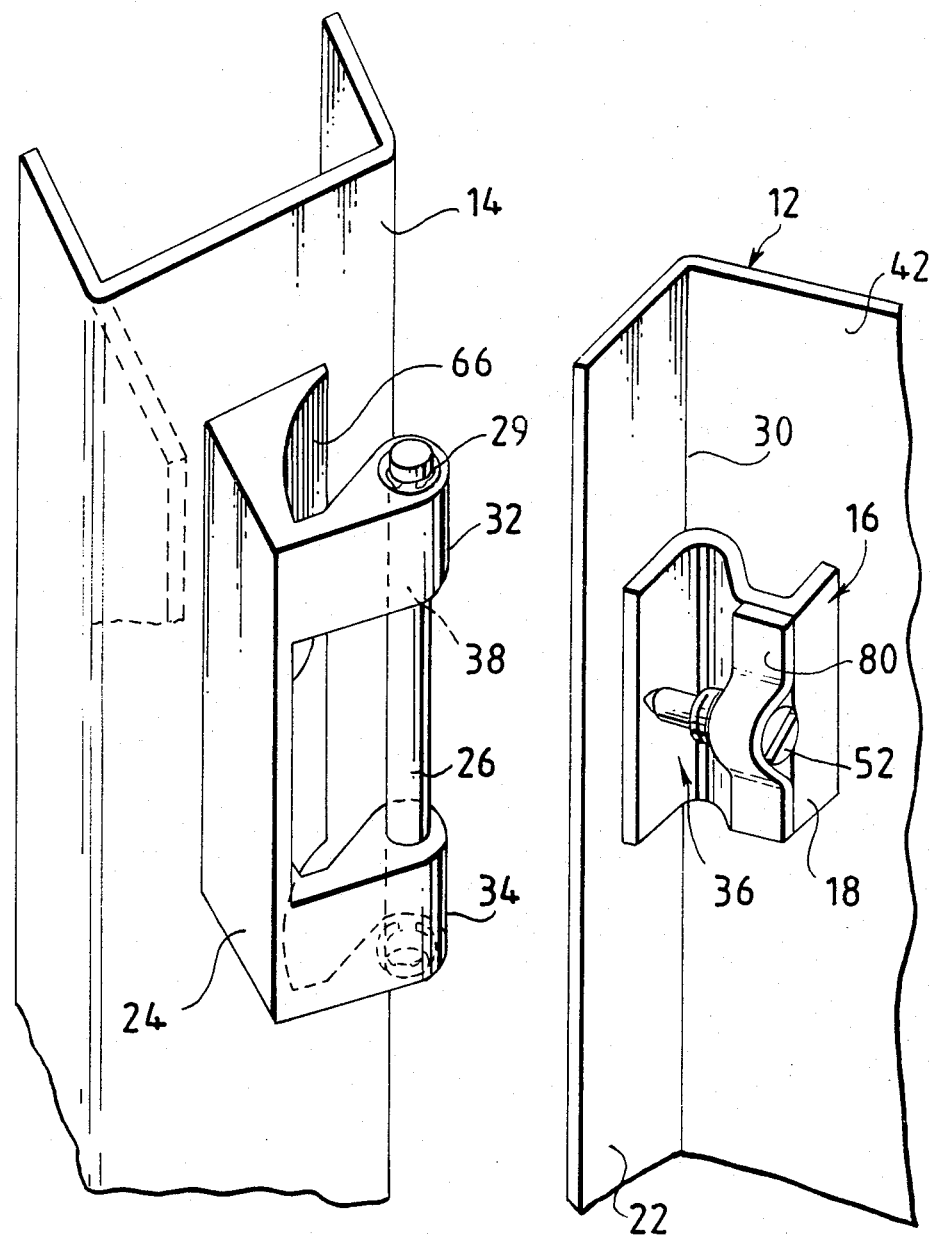
FIG. 1 is a perspective view of the second hinge part with a rotatable bearing bolt and attached to a vertical frame member of a switching box.
FIG. 2 is a perspective view of the first hinge part which is, attached in the inner edge area of a door leaf.

FIG. 3 is a top view and FIG. 4 a front view (with the door leaf removed) of an unhingeable concealed hinge 10 for switching boxes. As can be seen from FIG. 4, when the first and second hinge parts are assembled into the unhingeable concealed hinge 10, the second hinge part 24 is engaged by the first hinge part and is connected to a vertical frame section 14 of the box. The second hinge part 24 is, as can be seen from FIG. 1, U-shaped and has, at the ends of its U-limbs 32,34 a bearing eye 38 into which a bearing bolt 26 can be inserted and held in a rotating manner. So that the bearing bolt cannot fall out, it has an annular groove 28, see FIG. 6, at each of its two ends, for a securing ring 29, see FIG. 1.

The bearing eye 36 of the first hinge part 16 is formed by a bearing block 18 with a generally U-shaped cross sectional area 19 which mates with bearing bolt 26 of the second hinge part, (see FIG. 8). The bearing block is attached in the corner area 30 of door leaf edge 22, for example by means of spot welding.

Figure 16:
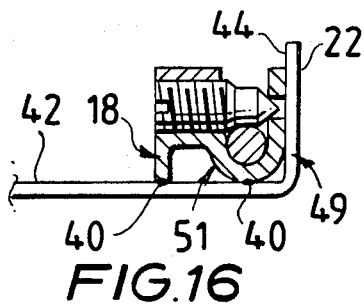
FIG. 16 is the view to FIG. 15 after introduction of the bearing bolt and its clamping by means of a locking screw.
Figure 17:
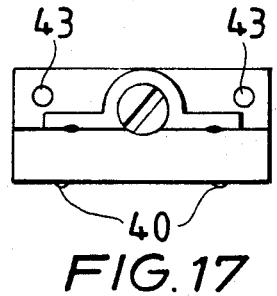
FIG. 17 is a side view taken from the left of FIG. 16.

Such welding points are shown in FIGS. 16 and 17, welding taking place with the inside surface of door leaf 42, but the bearing block 18 can also be welded to the inner surface 44 of edge 22.

This type of attachment has the advantage that it requires no holes or screws and is therefore not externally visible, which is of particular importance for "concealed" hinges.

Other methods of attachment are also possible, for example sticking the outer surface 48 of the bearing block 18 shown in FIG. 8 to the inner surface 44 of the edge section is possible, as is screwing, for instance, using cap screws 45 which are passed through edge section 22 and screwed into corresponding threaded borings 43 in the limb 49 (see FIG. 18 for example) parallel to edge 22 in such a way that they do not project beyond the inner surface of this limb 49 and therefore do not hinder the introduction of bearing bolt 26 into the U-section 19.

Figure 15:
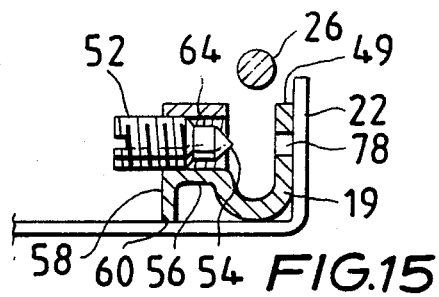
FIG. 15 is a cross sectional view of the first hinge part before introduction of the bearing bolt of the second hinge part.
Figure 18:
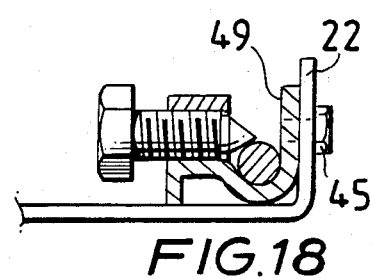
FIG. 18 shows a further embodiment of the first hinge part with the bearing bolt of the second hinge part secured therein.
Figure 19:
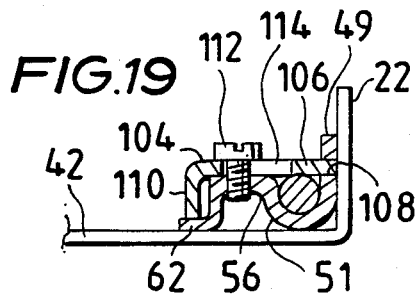
FIG. 19 is a cross sectional view of a further embodiment of the first hinge part.

In order to prevent the bearing bolt 26 from inadvertantly moving from the U-section 19 after it has been introduced, a clamping arrangement 50 is provided which can be slid over the open end of the U-section 19 in order to tightly clamp the bearing bolt 26 in the U-section 19. The clamping device can be of various types, for example, it can consist of a locking screw 52 with a conical end 54 (see FIG. 5) which is taken up in a threaded boring 58 formed in the angled limb 56. This type of embodiment can be seen in FIGS. 15 and 16. One limb 49 of the U-section 19 of bearing block 18 lies parallel to door leaf edge 22, preferably resting on the latter and if possible, stuck, welded or screwed to it as described above. In contrast, the other limb 51 of the U-section 19 is perpendicularly bent away from limb 49 in the vicinity of the end of the receptacle space for bearing bolt 26 (see reference number 56) so as to run parallel and at a distance to door leaf surface 42, finally turning back towards door leaf surface 42 (see reference number 58) in order to be supported on the inner door leaf surface 42 by means of the face 60 of this bend 58 (or by means of a foot section 62 formed by a further bend, see the embodiment shown in FIG. 19). This face 60 or foot 62 can be spot welded to door leaf surface 42 as described (see reference number 40). According to FIG. 15 the clamping arrangement consists of a locking screw 52 with a conical end, (see also the separate view of this screw in FIG. 5) the locking screw being accommodated in a threaded boring 64 in the bent limb 51. FIG. 15 shows a setting of this locking screw which makes it possible to insert the bolt 26 into the cross sectional area of U-section 19 past the tip of locking screw 52. In this screw 52 position the door leaf 12 according to FIG. 2 with its hinge part 16 can be assembled in hinge part 24 which is already attached to box 14 and already includes the bearing bolt as can be seen in FIG. 1. Hanging can be carried out with the door leaf in the open position as a result of the recess 66 formed by both U-limbs 32,34 of the second hinge part 24 (see also FIG. 23 which shows four more detailed views of the second hinge part) into which edge 22 of door leaf 12 can penetrate, so that the operating end 68 of locking screw 52, for example the screwdriver slit 70, is easily accessible and the locking screw can be tightened so that it hold hinge bolt 26 fast with either its conical end 54, as shown in FIG. 18, or with a cylinder section 74, which has a reduced diameter vis-a-vis threaded section 72 of locking screw 52.

The clamping effect can be increased if the diameter reduction between threaded section 72 and threaded section 74 is formed by a taper 76, which rests against the circumference of bearing bolt 26 when the locking screw 52 is tightened (see also FIG. 16 which shows this position).

The limb 49 of U-section 19 lying parallel to the door leaf edge 22 can, as shown in FIGS. 15 and 16, has a boring 78 for accommodating the tip 54 of locking screw 52 in order to hold the screw at both ends within U-section 19, thereby further increasing the stability of the arrangement. If the components are precisely dimensioned it is also possible for clamping of bolt 26 by taper 76 (see FIG. 5) with simultaneous supporting of tip 54 in boring 78 to take place, resulting in a rigid and firm connection between the first hinge part 18 and bearing bolt 26. Hinge movement is then produced by rotation of the bearing bolt 26 in borings 38 of the second hinge part.

Should the locking screw leave the bolt some play, the bearing bolt 26 could also be firmly anchored in the second hinge part 24 with rotation taking place within the first hinge part. However, this embodiment is less advantageous as the holding surface provided by the locking screw is relatively small and therefore there is a danger of the bolt 26 being damaged by the screw over the course of time.

If required, the support surface of the locking screw can be increased by means of a hollow in the bearing bolt 26 corresponding to the radius of the locking screw tip (see FIG. 16).

The first hinge part 16 can, in a similar way to the second hinge part 24, be manufactured by injection moulding, in which case the threaded boring can be produced in the material of this injection. It is less expensive to produce component 16 by stamping and pressing, as described in more detail in FIGS. 7 to 14. The original material is a flat material which, through various stamping and shaping measures and spot welding results in the embodiments according to FIGS. 3 and 4 and 15 to 17.

First of all U-section 19 is prepared by producing a flat blank 81 in a first stamping (see FIG. 11), the subsequent limb 49 already has hole 78. An inner rectangle 82 and a further rectangular incision 84 are stamped free.

The second bending and shaping stage produces the cross section according to FIG. 8 with sharp edges at corners 86 and 88 formed by the stamped free areas 82, 84. This is advantageous because the subsequent threaded area 64 is to be formed here. For this purpose a second stamped component is produced by stamping and simultaneous or subsequent bending into the shape a shown in FIGS. 12 and 13, which also has sharp edges 90, 92, This hoop is arranged on stay area 56 and screwed tightly, for instance, or, preferably spot welded (see welding points 94 in FIGS. 12, 13 and 14). Through material flow the stay 96 remaining between the stamped free areas 84, 86 can be shaped into a type of wave form, as can be seen in FIG. 10. This wave form produces part of a circle 98, which, with corresponding part circle 100 of hoop 80 (see FIG. 12), forms an essentially closed inner circle 102 according to FIG. 14, after hoop 80 has been welded onto bearing block 18. Then a thread can be cut into the thus formed "boring" with sharp end surfaces, thereby producing threaded boring 64. Using this stamping method and exclusively flat material the hinge part shown in FIGS. 15, 16 or 17 is produced by stamping, shaping and spot welding stages, whereby the sharp edge 60 in part 81 becomes the subsequent face 60.

In place of a locking or grub screw 52 a screw with a cap also be used, for example a hexagonal cap as can be seen in FIG. 18.

Figure 20:
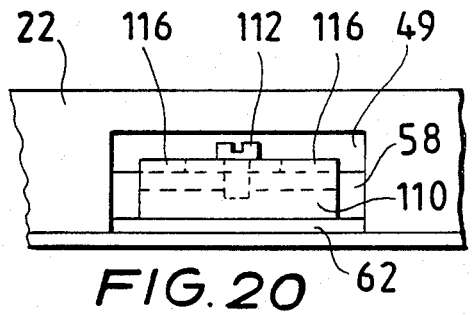
FIG. 20 is a side view of the embodiment shown in FIG. 19.

However, the clamping arrangement can also be formed differently, in that the hoop 18 is not assembled on the U-section in cross section form according to FIG. 15, but an angled section 104 (see FIG. 19), one limb of which 106 closes the U-section and, if necessary, is supported in the U-limb 49 parallel to door leaf edge 22 (reference number 108) and the other limb 110 rests on the inner surface of the door leaf 42 or on a further bent section 62 of U-section 51. This angled section 104 is clamped to the bearing block 18 by means of a cap screw 112 which is passed through a long hole 114 in limb 106 and screwed into a threaded boring in bent limb area 56. Support 108 can be through two rectangular slits 116 in limb 49, which engage with corresponding projections or noses of limb 106 (see FIG. 20).

Figure 21:
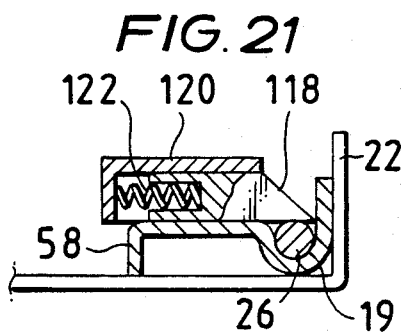
FIG. 21 is a cross sectional view of yet a further embodiment of the first hinge part.
Figure 22:
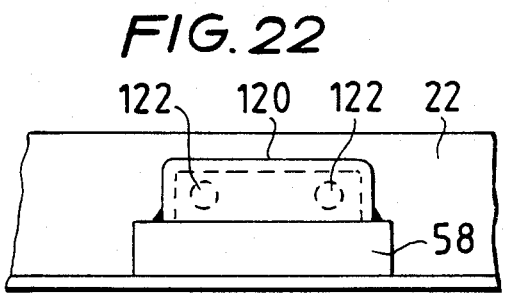
FIG. 22 is a side view of the embodiment shown in FIG. 21.

FIGS. 21 and 22 show another embodiment of the clamping arrangement consisting of a sprung bolt 118, which, in an appropriate guide 120, can be pushed to the left against the force of spring 122 by means of, for example, an eccentric screw, which is not illustrated, until the bearing bolt can be pulled out of the U-section 19. As a result of an inclined surface, introduction is facilitated as the bearing bolt 26 itself pushes bolt 118 to one side and attains its operational position, while the force of spring 122 then causes the bolt to snap back into position.

The second hinge part 24 which is attached to the box is shown in FIG. 23. It is basically U-shaped with already described members 32, 34 which contain the bearing eyes 38 for hinge bolt 26. The two members are connected to each other by means of a stay 124, which, in the area between the two members 32, 34, has two threaded borings 126 for accommodating locking screws 128, which pass through corresponding borings in box 14 and thus hold the hinge part 24 to the latter. For more accurate centering there may be rectangular projections 130 from the support surface to stay 124, which engage in corresponding holes in box 14 and thus guarantee accurate positioning of hinge part 24 with regard to box 14. In this way screw bolt 128 is protected against shearing forces so that there is more stable fixing overall. Between the two borings 126 there is a circular hole 132 for making space for the path of locking screw 52 with its hoop 80 forming the thread. In addition, the aforementioned incision 66 can be seen, serving to take up edge 22 of door leaf 12, whereby, depending on the extent of edge 22 away from the door leaf inner surface 42, a certain maximum opening angle for the door leaf with regard to the door frame is produced. With the dimensions shown in FIG. 3 there is a maximum opening angle of 120 to 140 degrees. If a greater distance between the door leaf and the box, i.e. a larger gap 130, is not obtrusive, the dimensions can be modified in such a way that a door opening angle of 180 degrees is achieved. For this the turning axis of the hinge bolt would be further away from the inner surface of the door leaf and the depth of incision 66 would be moved further behind the plane parallel to the door leaf surface by the pivoting axis, so that this depth is of the same size as the amount by which the edge projects beyond this axis plane.

The described embodiments permit hinge part 16 to be removed from hinge part 24, thereby removing door leaf 12 from the box, by loosening the clamping arrangement. For example the locking screw 52 can be removed according to FIG. 2 without the clamping arrangement having to be completely removed. The operating device is horizontally accessible, so that the hinge arrangement can also be located right at the top in the corner, which is sometimes an advantage for reasons of stability. The particular shape of hinge part 18 forms a funnel which substantially facilitates when introducing hinge part 18 into hinge part 24 when the door is reassembled. This is particularly important if several hinges are arranged on one door leaf. After approximate hanging there is no need for precise aligning because simply tightening the locking screws 52 results in clamping and simultaneous precise aligning, due to the conical shape of locking screws 52. A commercially available tool, such as a screwdriver, is adequate for this.

Vis-a-vis the state of the art only one component has to be manipulated and imprecise preliminary fixing is sufficient, as the conical screw ensures an accurate fit in the U-shaped hinge part when tightened. If the second hinge part is not so easily accessible, due to a particular design of the door leaf, see, for instance, the additional angle shown by the broken line in FIG. 3 producing a channel-type space for accommodating the hinge arrangement, then, in place of the locking screw with a screwdriver slit, a screw with an inner head or a screw according to FIG. 18, i.e. with a hexagonal head, can be used without the assembly being negatively affected.

What is claimed is:

1. In combination, a concealed hinge and door assembly for switching boxes comprising:
   a door leaf with an inner surface and an edge section with an inner surface, the inner surfaces of the door leaf and the edge section of the door leaf forming a corner area;
   a first hinge part attached to the inner surface of the door leaf;
   a second hinge part surrounding the first hinge part in a shape of a U and connectable with a frame limb of the box, said second hinge part having U-limbs each with an end having a bearing eye;
   a bearing bolt for effecting an articulated connection of the hinge parts, the first hinge part having a bearing block with a U-shaped cross-section forming a bearing eye which accommodates the bearing bolt, the bearing block being fixed in the corner area of the edge section of the door leaf and having, over an open end of the U-shaped cross-section, a movable clamping arrangement for clamping the bearing bolt in the U-shaped cross-section, said bearing bolt extending an entire distance between the bearing eyes of the ends of the U-limbs of the second hinge part, said clamping arrangement including an elongated clamping member having a portion movable in a longitudinal direction into and out of said bearing eye of said first hinge part; and
   means for guiding said clamping member longitudinally towards and away from said bearing eye of said first hinge part, said guiding means including a bent limb with a bend at which extends a surface in said longitudinal direction from said open end and along which said clamping member moves longitudinally, said bent limb being integrally formed with said bearing block.

2. A concealed hinge according to claim 1, wherein the U-shaped cross-section is formed by a two-stage stamping process in which first free stamping and then bending and shape stamping takes place.

3. A concealed hinge according to claim 1 wherein the screw clamping arrangement includes a screw having an end, a cylinder portion with a reduced diameter and an adjoining conical end, the screw having a threaded section starting from said end to said cylinder portion.

4. A concealed hinge according to claim 3, wherein said end is formed with a screwdriver slit.

5. A concealed hinge according to claim 3, wherein said reduced diameter is formed by a tapered surface.

6. A concealed hinge according to claim 1, wherein the clamping device is formed by a sprung bolt.

7. A concealed hinge according to claim 1, further comprising:
   a guide element extending from said bent limb and which, together with said surface, radially surround said clamping member.

8. A concealed hinge according to claim 7, wherein said clamping member is a screw, said guiding element being a hoop having an inner threaded surface.

9. A concealed hinge according to claim 1, wherein said clamping member is an angled member having a portion extending into said bearing eye of said bearing block and further comprising:
   means for releasably locking said angled member to said bearing block.

10. In combination, a concealed hinge and door assembly for switching boxes comprising:
    a door leaf with an inner surface and an edge section with an inner surface, the inner surfaces of the door leaf and the edge section of the door leaf forming a corner area;
    first hinge part attached to the inner surface of the door leaf;
    a second hinge part surrounding the first hinge part in a shape of a U and connectable with a frame limb of the box, said second hinge part having U-limbs each with an end having a bearing eye;
    a bearing bolt for effecting an articulated connection for the hinge parts, the first hinge part having a bearing block with a U-shaped corss-section forming a bearing eye which accommodates the bearing bolt, the bearing block being fixed in the corner area of the edge section of the door leaf and having, over an open end of the U-shaped cross-section, a movable clamping arrangement for clamping the bearing bolt in the U-shaped cross-section, said bearing bolt extending an entire distance between the bearing eyes of the ends of the U-limbs of the second hinge part, said clamping arrangement including an elongated clamping member having a portion movable in a longitudinal direction into and out of said bearing eye of said first hinge part; and means for guiding said clamping member longitudinally towards and away from said bearing eye of said first hinge part, said guiding means including a bent limb with a bend at which extends a surface in said longitudinal direction from said open end and along which said clamping member moves longitudinally, said bent limb being integrally formed with said bearing block;

a first limb of the U-section of the bearing block being parallel to the door leaf edge, the bent limb being a second limb of the U-section that is bent away perpendicularly with respect to the first limb and runs parallel and at a distance to a plane of the door leaf, said second limb having an end with a further bend towards a door leaf surface of the door leaf and being supported on the door leaf, the clamping arrangement being formed by a screw with a conical front end which is taken up by the threaded boring in the bent limb.

11. A concealed hinge according to claim 10, wherein the first limb parallel to the door leaf edge has a boring formed to accommodate a tip of the screw.

12. A concealed hinge according to claim 10, wherein said second limb is supported on a portion of the U-shaped cross section on the door leaf.

13. In combination, a concealed hinge and door assembly for switching boxes comprising:

a door leaf with an inner surface and an edge section with an inner surface, the inner surfaces of the door leaf and the edge section of the door leaf forming a corner area;

a first hinge part attached to the inner surface of the door leaf;

a second hinge part surrounding the first hinge part in a shape of a U and connectable with a frame limb of the box, said second hinge part having U-limbs each with an end having a bearing eye;

a bearing bolt for effecting an articulated connection of the hinge parts, the first hinge part having a bearing block with a U-shaped cross-section forming a bearing eye which accommodates the bearing bolt, the bearing block being fixed in the corner area of the edge section of the door leaf and having, over an open end of the U-shaped cross-section, a movable clamping arrangement for clamping the bearing bolt in the U-shaped cross-section, said bearing bolt extending an entire distance between the bearing eyes of the ends of the U-limbs of the second hinge part, said clamping arrangement including an elongated clamping member having a portion movable in a longitudinal direction into and out of said bearing eye of said first hinge part; and means for guiding said clamping member longitudinally towards and away from said bearing eye of said first hinge part, said guiding means including a bent limb with a bend at which extends a surface in said longitudinal direction from said open end and along which said clamping member moves longitudinally, said bent limb being integrally formed with said bearing block; said bent limb having an end at which extends a further bent limb.

* * * * *